(12) United States Patent
Crossley et al.

(10) Patent No.: US 8,082,217 B2
(45) Date of Patent: Dec. 20, 2011

(54) MULTIPHASE FLOW METER FOR ELECTRICAL SUBMERSIBLE PUMPS USING ARTIFICIAL NEURAL NETWORKS

(75) Inventors: Alexander Crossley, Broken Arrow, OK (US); De Hao Zhu, Claremore, OK (US); Jerald R. Rider, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 812 days.

(21) Appl. No.: 12/133,704

(22) Filed: Jun. 5, 2008

(65) Prior Publication Data

US 2008/0306892 A1 Dec. 11, 2008

Related U.S. Application Data

(60) Provisional application No. 60/943,213, filed on Jun. 11, 2007.

(51) Int. Cl.
*G06N 3/08* (2006.01)
(52) U.S. Cl. .......................................................... 706/16
(58) Field of Classification Search ...................... 706/16
See application file for complete search history.

(56) References Cited

U.S. PATENT DOCUMENTS

| 5,845,709 | A | 12/1998 | Mack et al. |
| 6,566,769 | B1 | 5/2003 | Layton |
| 6,585,041 | B2 | 7/2003 | Crossley |
| 6,587,037 | B1 | 7/2003 | Besser et al. |
| 6,789,620 | B2 * | 9/2004 | Schultz et al. ........... 166/250.15 |
| 6,798,338 | B1 | 9/2004 | Layton |
| 6,947,870 | B2 | 9/2005 | Zhu et al. |
| 2006/0022786 | A1 | 2/2006 | Layton |

FOREIGN PATENT DOCUMENTS

EP 1 279 794 A1 1/2003

OTHER PUBLICATIONS

Kermit E. Brown, "The Technology of Artificial Lift Methods", pp. 113-117 and 134-138, vol. 1.
International Search Report PCT/US2008/066574 and Written Opinion, Oct. 13, 2008 (12 pages).

* cited by examiner

*Primary Examiner* — Michael B Holmes
(74) *Attorney, Agent, or Firm* — Bracewell & Giuliani LLP

(57) ABSTRACT

A multiphase flow meter used in conjunction with an electrical submersible pump system in a well bore includes sensors to determine and transmit well bore pressure measurements, including tubing and down hole pressure measurements. The multiphase flow meter also includes at least one artificial neural network device to be used for outputting flow characteristics of the well bore. The artificial neural network device is trained to output tubing and downhole flow characteristics responsive to multiphase-flow pressure gradient calculations and pump and reservoir models, combined with standard down-hole pressure, tubing surface pressure readings, and the frequency applied to the electrical submersible pump motor.

17 Claims, 2 Drawing Sheets

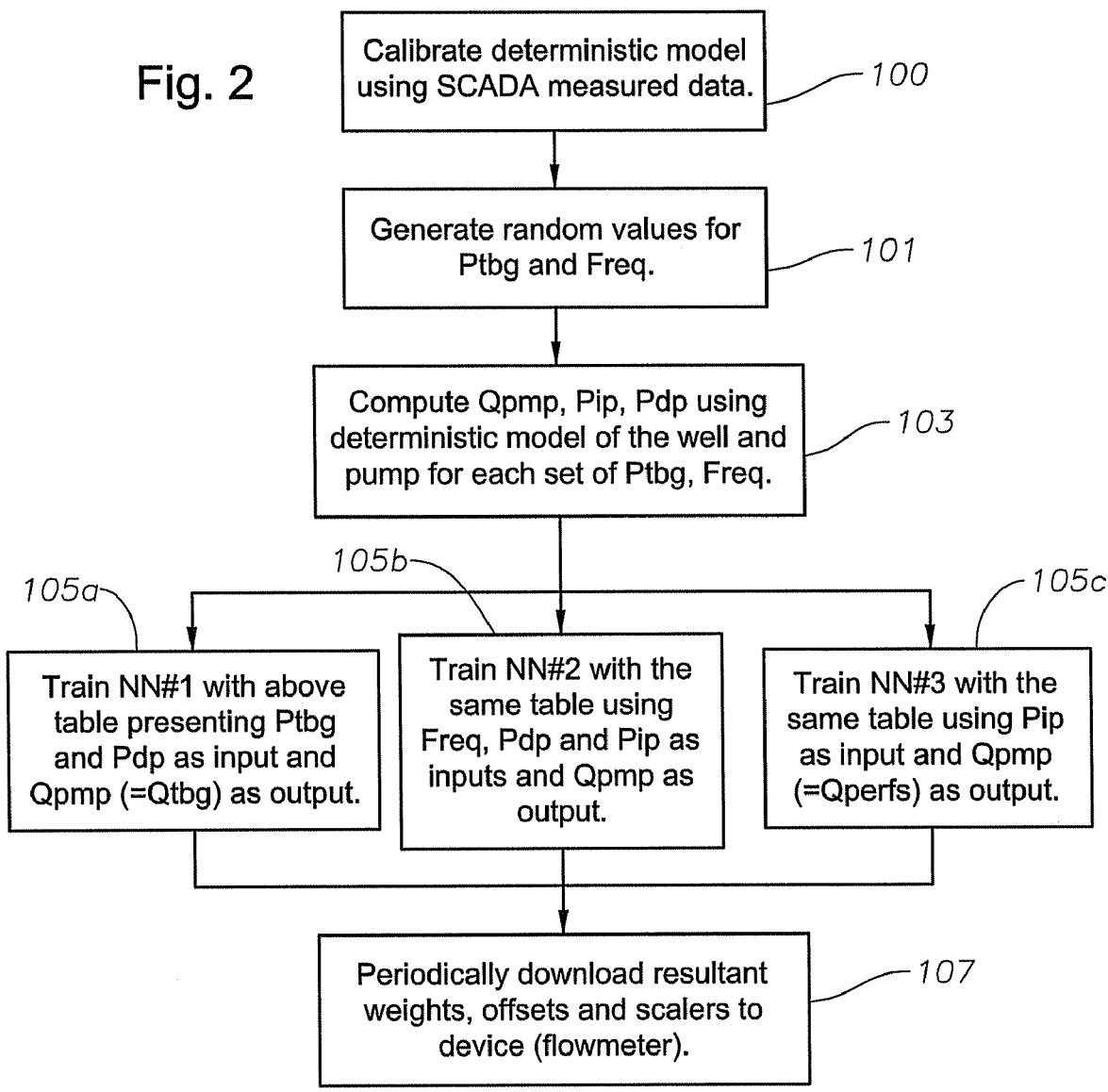
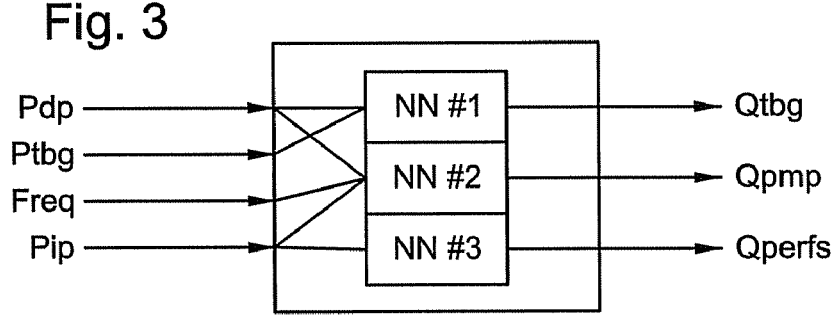

MULTIPHASE FLOW METER FOR ELECTRICAL SUBMERSIBLE PUMPS USING ARTIFICIAL NEURAL NETWORKS

RELATED APPLICATIONS

This application claims priority to U.S. Provisional Patent Application No. 60/943,213, titled Multi-Phase Flow Meter for Electrical Submersible Pumps Using Artificial Neural Networks, filed on Jun. 11, 2007.

BACKGROUND

1. Field of Invention

The present invention is directed, in general, to measurement and control systems for subterranean pumping equipment and, in particular, to flow meters utilizing neural networks trained to output downhole flow characteristics based upon tubing and downhole pressure measurements communicated from downhole sensors.

2. Background

It is known that most instrumented oil wells do not include individual flow meters. Reasons include high initial costs, maintenance problems, inaccessibility, and inaccuracy of measurements due to the multiphase nature of liquid oil, water, and gas phases typically present in the flow stream. Multiphase flow meters are known, but are quite expensive.

It is also known for neural networks can be used to test a new design for machinery including motors and pumps used with artificial lift technology and systems. See, particularly, U.S. Pat. No. 6,947,870, issued Sep. 20, 2005, titled Neural Network Model for Electrical Submersible Pump System, which has common inventors and is commonly assigned with the present application.

SUMMARY OF INVENTION

Embodiments of the present invention provide a special multiphase flow meter, used in conjunction with an electrical submersible pump system in a well bore, which enables tubing and downhole pressure measurements to be used for determining flow rates. The multiphase flow meter includes at least one artificial neural network device and at least one pressure sensor placed in a wellbore. The artificial neural network device is trained to output tubing and downhole flow characteristics responsive to multiphase-flow pressure gradient calculations and pump and reservoir models, combined with standard down-hole pressure and tubing surface pressure readings.

For example, embodiments of the present invention can determine a tubing flow rate responsive to a pump discharge pressure and a tubing surface pressure. Embodiments of the present invention can also determine a pump flow rate responsive to a pump discharge pressure measurement, a pump intake pressure measurement, and a frequency of a motor associated with the electrical submersible pump. In addition, embodiments of the present invention can determine a flow rate at perforations responsive to a pump intake pressure.

BRIEF DESCRIPTION OF DRAWINGS

Some of the features and benefits of the present invention having been stated, others will become apparent as the description proceeds when taken in conjunction with the accompanying drawings, in which:

FIG. 2 is a high level flow chart detailing a neural network training algorithm according to an embodiment of the present invention; and FIG. 3 is a block diagram illustrating the functionality of a multiphase flow meter according to an embodiment of the present invention.

Figure 1:
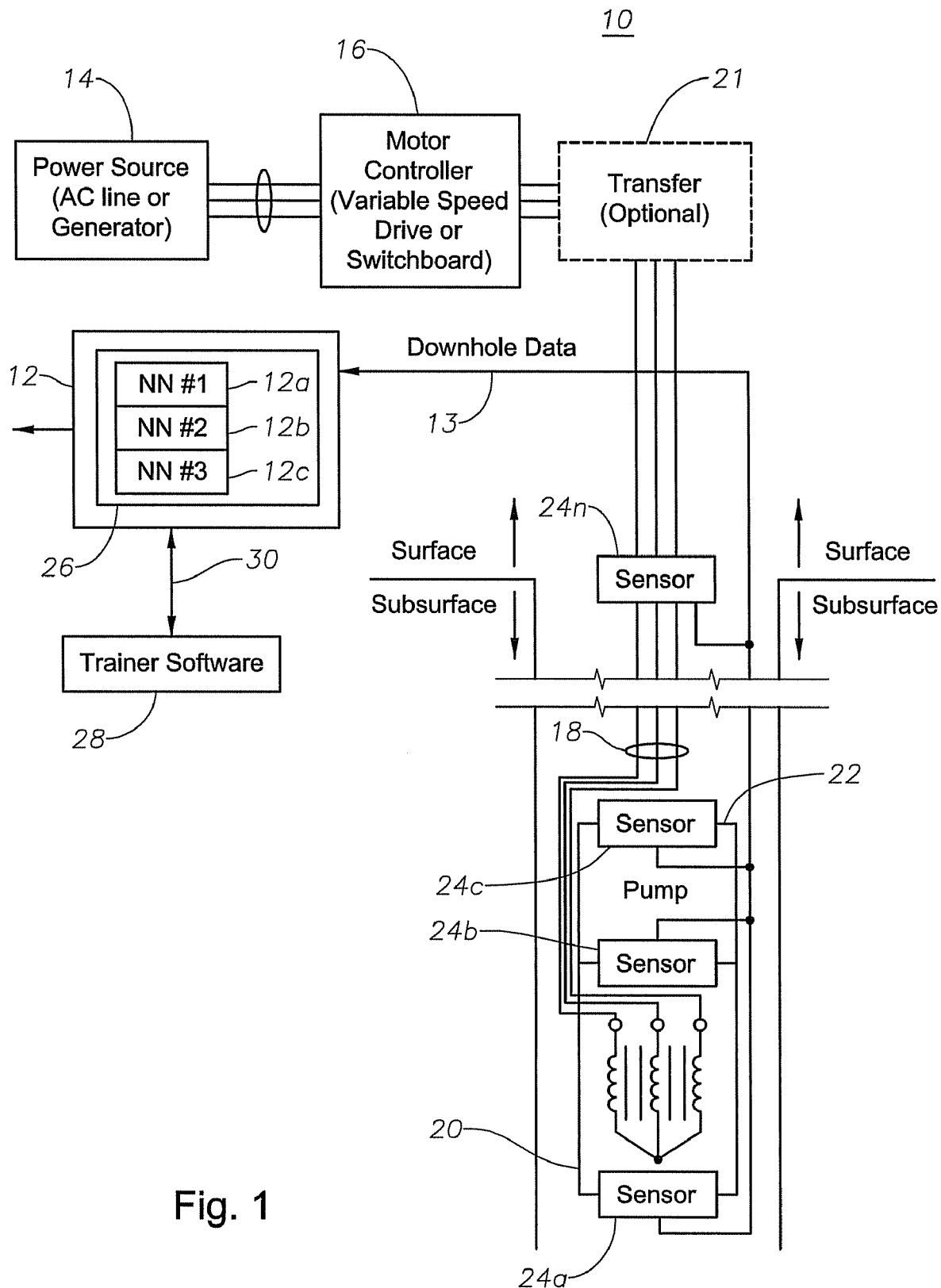
FIG. 1 illustrates a downhole production system including a multiphase flow meter according to an embodiment of the present invention.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Embodiments of the present invention provide, for example, a method of determining flow rate characteristics in a well bore. The method includes determining one or more pressure measurements at one or more sensors associated with an electrical submersible pump system in a well bore. The method also includes transmitting the one or more pressure measurements from the one or more sensors to an artificial neural network device. The method further includes outputting a flow characteristic of the well bore by the artificial neural network device responsive to the one or more transmitted pressure measurements. The method can also include controlling the electrical submersible pump system responsive to the flow characteristic of the well bore output by the artificial neural network device. The method can also include logging data from the one or more pressure measurements at one or more sensors and from the flow characteristic of the well bore output by the artificial neural network device.

Other embodiments of the present invention provide a method of determining flow rate characteristics in a well bore. The method includes determining a pressure at an intake of an electrical submersible pump system in a well bore defining a pump intake pressure, determining a pressure at a discharge of the electrical submersible pump system in the well bore defining a pump discharge pressure, and determining a pressure at a surface of the well bore defining a tubing surface pressure. The method also includes outputting a flow characteristic of the well bore by an artificial neural network device responsive to one or more of the pump intake pressure, the pump discharge pressure, and the tubing surface pressure.

Embodiments of the present invention provide, for example, a multiphase flow meter for an electrical submersible pump system. The system includes a pressure sensor located at a surface of a well bore, an electrical submersible pump located in the well bore, a pressure sensor located at an intake of the electrical submersible pump, a pressure sensor located at a discharge of the electrical submersible pump, and a motor located in the well bore and attached to the electrical submersible pump. The system also includes at least one artificial neural network device including a processor and circuitry capable of receiving a measurement transmitted from a pressure sensor associated with the well bore and of outputting a flow characteristic of the well bore responsive to one or more received measurements.

FIG. 1 illustrates an exemplary embodiment of a downhole production system 10 including a multiphase flow meter 12. Downhole production system 10 includes a power source 14 comprising an alternating current power source such as an electrical power line (electrically coupled to a power utility plant) or a generator electrically coupled to and providing three phase power to a motor controller 16. Motor controller 16 can be any of the well known varieties, such as pulse width modulated variable frequency drives, switchboards or other known controllers. Both power source 14 and motor controller 16 are located at the surface level of the borehole and are electrically coupled to an induction motor 20 via a three phase power cable 18. An optional transformer 21 can be electrically coupled between motor controller 16 and induction motor 20 in order to step the voltage up or down as required.

Further referring to the exemplary embodiment of FIG. 1, the downhole production system 10 also includes artificial lift equipment for aiding production, which comprises induction motor 20 and electrical submersible pump 22 ("ESP"), which may be of the type disclosed in U.S. Pat. No. 5,845,709. Motor 20 is electromechanically coupled to and drives pump 22, which induces the flow of gases and liquid up the borehole to the surface for further processing. Three phase cable 18, motor 20 and pump 22 form an ESP system.

Downhole production system 10 also includes a multiphase flow meter 12 which includes sensors 24a-24n. Multiphase flow meter 12 may also include a data acquisition, logging (recording) and control system which would allow meter 12 to control the downhole system based upon the flow characteristic determined by meter 12. Sensors 24a-24n are located downhole within or proximate to induction motor 20, ESP 22 or any other location within the borehole. Any number of sensors may be utilized as desired.

Sensors 24a-24n monitor and measure various conditions within the borehole, such as pump discharge pressure, pump intake pressure, tubing surface pressure, vibration, ambient well bore fluid temperature, motor voltage, motor current, motor oil temperature, and the like. Sensors 24a-24n communicate respective measurements to flow meter 12 via downhole link 13 on at least a periodic basis utilizing techniques, such as, for example, those disclosed in U.S. Pat. Nos. 6,587,037 and 6,798,338. In an alternate embodiment, flow meter 12 may similarly communicate control signals to motor 20, ESP 22 or other downhole components utilizing any variety of communication techniques known in the art. Such control signals would regulate the operation of the downhole components in order to optimize production of the well.

Further referring to the exemplary embodiment of FIG. 1, flow meter 12 contains a processor 26 electrically coupled to three programmable artificial neural networks 12a, 12b and 12c which compute downhole flow rate characteristics based upon the downhole data received from sensors 24a-24n. However, any number of neural networks could be utilized within processor 26 as desired.

Flowmeter 12 may be constructed as a standalone device having a CPU 26 and programmable memory (flash memory or otherwise), which handles all necessary data computation, such as floating point math calculations. Flowmeter 12 also contains communications ports which allow a data acquisition controller to exchange downhole data via bi-directional communications link 13 which is used by neural networks 12a-c to determine the flow rate characteristics. These ports also allow the transmission of training parameters (e.g., weights, scales and offsets) from training software 28 to neural networks 12a-c via bi-directional communications link 30.

As discussed above, neural networks 12a-c are programmed (or trained) via the trainer software 28, which periodically downloads training data (e.g., weights, offsets and scalars) to processor 26 via link 30. Training software 28 is in charge of generating the training sets and training neural networks 12a-c to output the desired flow characteristics in the desired measurement units. Trainer software 28 can be comprised of, for example, software used to determine flow characteristics based on ESP modeling including mathematics for calculation of friction loses and pressure gradients in tubulars in multiphase flow conditions, such as, Hagedom & Brown correlation, Beggs & Brill, those discussed in "The Technology of Artificial Lift Methods," by Kermit E. Brown or those disclosed in U.S. Pat. No. 6,585,041 or 6,947,870. In addition, a user may make manual adjustments to the software model to reflect information from other wells.

In order to conduct training, flow meter 12 is periodically coupled to trainer software 28 via a bi-directional link 30, which can be, for example, a wired or wireless connection. In the alternative, however, this training, also known as back propagation, may be conducted internally by processor 28 itself, without the need of external trainer software 28. Link 30 could also be used to download data from a data logging memory which can form part of flow meter 12. Periodic measurements received from sensors 24a-24n via downhole link 13 can also be communicated to trainer software 28, which in turns utilizes the measurements for training or re-training of neural networks 12a-12c.

With reference to FIGS. 1 and 2, an exemplary embodiment of the training algorithm of neural networks 12a-12c will now be described. As discussed previously, training software 28 trains neural networks 12a-c to utilize downhole pressure readings to determine downhole flow characteristics. Various training algorithms, or deterministic models, could be used to accomplish this. The basic concepts underlying artificial neural networks are known in the art.

Referring to FIG. 2, at step 100, the deterministic model is calibrated using real-life SCADA measured data (e.g. pump intake pressure, pump discharge pressure, flow, etc.). At step 101, training software 28 generates random values for the tubing surface pressure (Ptbg) and motor frequency (Freq). In addition, values for the productivity index (PI), water cut (wc %), gas oil ratio (GOR), bottom hole temperature (BHT), static pressure (Pr) or any other variable may be randomly generated by software 28 or manually entered at step 101 and used in the training algorithm.

Once the values have been generated at step 101, at step 103, software 28 computes values not limited to the pump flow rate (Qpmp), pump intake pressure (Pip) and pump discharge pressure (Pdp) using a deterministic model of the well and pump for each set of Ptbg and Freq. Training software 28 takes these inputs and computed values and creates a table containing any number of values. Thereafter, at step 105a, neural network 12a is duplicated within training software 28 and trained with the table presenting Ptbg and Pdp as input and Qpmp as output. At step 105b, neural network 12b is duplicated within training software 28 and trained with the same table using Freq, Pdp and Pip as inputs and Qpmp as output. At step 105c, neural network 12c is also duplicated within software 28 and trained with the same table using Pip as input and Qpmp as output.

During training steps 105a-c, each duplicate neural network scans the table multiple times, adjusting its weights as needed to minimize the error. This is called back-propagation.

Once trained to a desired percentage of accuracy, the resultant weights, offsets and scalars can be downloaded at a later time to neural networks 12a-c within flow meter 12 via bi-directional link 30 at step 107.

Once the training values have been downloaded to neural networks 12a-c in step 105, each neural network 12a-c is now ready to receive the actual downhole measurements and compute flow rate characteristics. As illustrated in FIG. 3, trained neural network 12a outputs tubing flow rate (Qtbg) based upon measurements of Pdp and tubing surface pressure (Ptbg) received from sensors 24a-n via downhole link 13. Please note that these downhole measurements (Ptbg and Pdp) require a relatively long pipe that will guarantee measurable pressure loses due to friction.

Trained neural network 12b outputs pump flow rate (Qpmp) based on the motor's frequency (Freq) or pump RPM, intake pressure (Pip) and discharge pressure (Pdp) measurements received from sensors 24a-n received via link 13. In order for neural network 12b to accurately output Qpmp over time, an approximate knowledge of pump performance, also known in the art as the pump characteristic curve, is required. Such data can be manually updated (or otherwise communicated) into training software 28 before training is conducted. By taking pump characteristics into account, this will enable software 28 to be continuously calibrated over time, which will, in turn, enable accurate training of neural network 12b over time.

The measurements of Qtbg and Qpmp can be compared by processor 26 or transmitted elsewhere for logging, for troubleshooting the ESP system, or for calibration purposes. Trained neural network 12c outputs the flow rate at the perforations (Qperfs) based on the known static pressure (Pr) and productivity index (PI) of the well and pump intake pressure (PI) readings obtained by sensors 24a-24n. Once Qtbg, Qpmp and Qperfs have been calculated by neural networks 12a, 12b and 12c respectively, flow meter 12 can transmit the flow characteristics to an external device to be used for any variety of reasons, such as motor control, pump control or further analysis.

In the exemplary embodiment detailed above, up to four inputs can be provided to the flow meter (Pip, Pdp, Ptbg and Freq) and up to three outputs (Qtbg, Qpmp and Qperfs) are possible. However, more or less inputs can be utilized depending upon design requirements, such as, for example, current, PI, Pr, wc %, BHT and GOR. Motor current or controller current can be included as an additional input for better immunity to varying fluid characteristics or well productivity changes. When calibrated correctly, Qpmp=Qtbg and any difference between these two values can be used for troubleshooting problems such as pipe or pump plugging or wear. For example, long after startup, when stable conditions are reached, all three flow rates should be the same (Qperfs=Qpmp=Qtbg). Therefore, if they are not, this would be an indication of a problem downhole or a calibration problem within the flow meter.

Moreover, if desired, flow meter 12 may treat an average of these three flow rates as a single output. In the most preferred embodiment, processor 26 of flow meter 12 is only programmed to do neural network 12a-c's forward propagation as it is more practical to do the more intensive back propagation training externally in trainer software 28.

Flow meter 12 may take form in various embodiments. It may be part of the hardware located at the well site, included in the software of a programmable ESP controller, switchboard or variable speed drive, or may be a separate box with its own CPU and memory coupled to such components. Also, flow meter 12 may even be located across a network as a piece of software code running in a server which receives downhole readings via a communications link between the server and downhole bore.

It is important to note that while embodiments of the present invention have been described in the context of a fully functional system and method embodying the invention, those skilled in the art will appreciate that the mechanism of the present invention and aspects thereof are capable of being distributed in the form of a computer readable medium of instructions in a variety of forms for execution on a processor, processors, or the like, and that the present invention applies equally regardless of the particular type of signal bearing media used to actually carry out the distribution. Examples of computer readable media include but are not limited to: non-volatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, and other newer types of memories, and transmission type media such as digital and analog communication links. For example, such media can include operating instructions, instructions related to the system, and the method steps described above.

It is also to be understood that the invention is not limited to the exact details of construction, deterministic or training algorithms, operation, exact materials, or embodiments shown and described, as modifications and equivalents will be apparent to one skilled in the art. For example, flow meter 12 can be programmed to use any number of downhole measurement inputs in different combinations. Thus, if you do not have a discharge pressure reading, the present invention could utilize Freq, Pip and Ptbg to estimate the Qpmp. Also, if there is no intake pressure reading, it could use Ptbg and Pdp for estimating Qtbg. Lastly, if you only have Pip, you can program the neural networks to estimate Qperfs. Other embodiments can include additional inputs like current, PI, water cut, and GOR.

In the drawings and specification, there have been disclosed illustrative embodiments of the invention and, although specific terms are employed, they are used in a generic and descriptive sense only and not for the purpose of limitation. Accordingly, the invention is therefore to be limited only by the scope of the appended claims.

The invention claimed is:

1. A method of determining flow rate characteristics in a well bore, the method comprising:
   determining one or more pressure measurements at one or more sensors associated with an electrical submersible pump system in a well bore;
   transmitting the one or more pressure measurements from the one or more sensors to an artificial neural network device, the artificial neural network device including one of the following: external trainer software, and internal trainer software on the artificial neural network device;
   outputting a flow characteristic of the well bore by the artificial neural network device responsive to the one or more transmitted pressure measurements.

2. A method of claim 1, wherein the one or more pressure measurements at one or more sensors includes a pump discharge pressure and a tubing surface pressure, and wherein the flow characteristic of the well bore output by the artificial neural network device includes a tubing flow rate.

3. A method of claim 1, wherein the one or more pressure measurements at one or more sensors includes a pump discharge pressure and a pump intake pressure, and wherein the flow characteristic of the well bore output by the artificial neural network device includes a pump flow rate responsive to the pump discharge pressure measurement, the pump intake pressure measurement, and a frequency of a motor.

4. A method of claim 1, wherein the one or more pressure measurements at one or more sensors includes a pump intake pressure, and wherein the flow characteristic of the well bore output by the artificial neural network device includes a flow rate at perforations.

5. A method of claim 1, further comprising controlling the electrical submersible pump system responsive to the flow characteristic of the well bore output by the artificial neural network device.

6. A method of claim 1, wherein the step of outputting a flow characteristic of the well bore by the artificial neural network device is also responsive to a current measurement of one or more of the following: a motor current, and a controller current.

7. A method of determining flow rate characteristics in a well bore, the method comprising:
   determining a pressure at an intake of an electrical submersible pump system in a well bore defining a pump intake pressure;
   determining a pressure at a discharge of the electrical submersible pump system in the well bore defining a pump discharge pressure;
   determining a pressure at a surface of the well bore defining a tubing surface pressure;
   outputting a flow characteristic of the well bore by an artificial neural network device responsive to one or more of the following: the pump intake pressure, the pump discharge pressure, and the tubing surface pressure, wherein the artificial neural network device includes one of the following: external trainer software, and internal trainer software on the artificial neural network device.

8. A method of claim 7, wherein the flow characteristic of the well bore output by the artificial neural network device includes a tubing flow rate responsive to pump discharge pressure and a tubing surface pressure.

9. A method of claim 7, wherein the flow characteristic of the well bore output by the artificial neural network device includes a pump flow rate responsive to the pump discharge pressure, the pump intake pressure, and a frequency of a motor associated with the electrical submersible pump system.

10. A method of claim 7, wherein the flow characteristic of the well bore output by the artificial neural network device includes a flow rate at perforations responsive to the pump intake pressure.

11. A method of claim 7, wherein the artificial neural network device is trained using a deterministic model, and wherein additional inputs to the artificial neural network device include a frequency of a motor associated with the electrical submersible pump system and a current measurement of one or more of the following: a motor current, and a controller current.

12. A method of claim 7, further comprising controlling the electrical submersible pump system responsive to the flow characteristic of the well bore output by the artificial neural network device.

13. A multiphase flow meter for an electrical submersible pump system, comprising:
   a pressure sensor located at a surface of a well bore;
   an electrical submersible pump located in the well bore;
   a pressure sensor located at an intake of the electrical submersible pump;
   a pressure sensor located at a discharge of the electrical submersible pump;
   a motor located in the well bore and attached to the electrical submersible pump; and
   at least one artificial neural network device including a processor and circuitry capable of receiving a measurement transmitted from a pressure sensor associated with the well bore and of outputting a flow characteristic of the well bore responsive to one or more received measurements, the artificial neural network device further including one of the following: external trainer software, and internal trainer software on the artificial neural network device.

14. A multiphase flow meter of claim 13, wherein a flow characteristic of the well bore includes a tubing flow rate, and wherein the artificial neural network device outputs the tubing flow rate responsive to a measurement from the pressure sensor at the discharge of the electrical submersible pump defining a pump discharge pressure and a measurement from pressure sensor at the surface of the well bore defining a tubing surface pressure.

15. A multiphase flow meter of claim 13, wherein a flow characteristic of the well bore includes a pump flow rate, and wherein the artificial neural network device outputs the pump flow rate responsive to a measurement from the pressure sensor at the discharge of the electrical submersible pump defining a pump discharge pressure, a measurement from the pressure sensor at the intake of the electrical submersible pump defining an intake pressure, and a frequency of the motor.

16. A multiphase flow meter of claim 13, wherein a flow characteristic of the well bore includes a flow rate at perforations, and wherein the artificial neural network device outputs the pump flow rate responsive to a measurement from the pressure sensor at the intake of the electrical submersible pump defining an intake pressure.

17. A multiphase flow meter of claim 13, further comprising trainer software periodically connected to the to the neural network device and capable of back propagation of the neural network device externally.

* * * * *

UNITED STATES PATENT AND TRADEMARK OFFICE
CERTIFICATE OF CORRECTION

PATENT NO. : 8,082,217 B2  Page 1 of 1
APPLICATION NO. : 12/133704
DATED : December 20, 2011
INVENTOR(S) : Alexander Crossley It is certified that error appears in the above-identified patent and that said Letters Patent is hereby corrected as shown below:

IN THE CLAIMS:

Column 6, claim 1, line 56, after "device;" insert --and--

Column 7, claim 7, line 28, after "pressure;" insert --and--

Signed and Sealed this
Tenth Day of April, 2012

David J. Kappos
*Director of the United States Patent and Trademark Office*